UNITED STATES PATENT OFFICE.

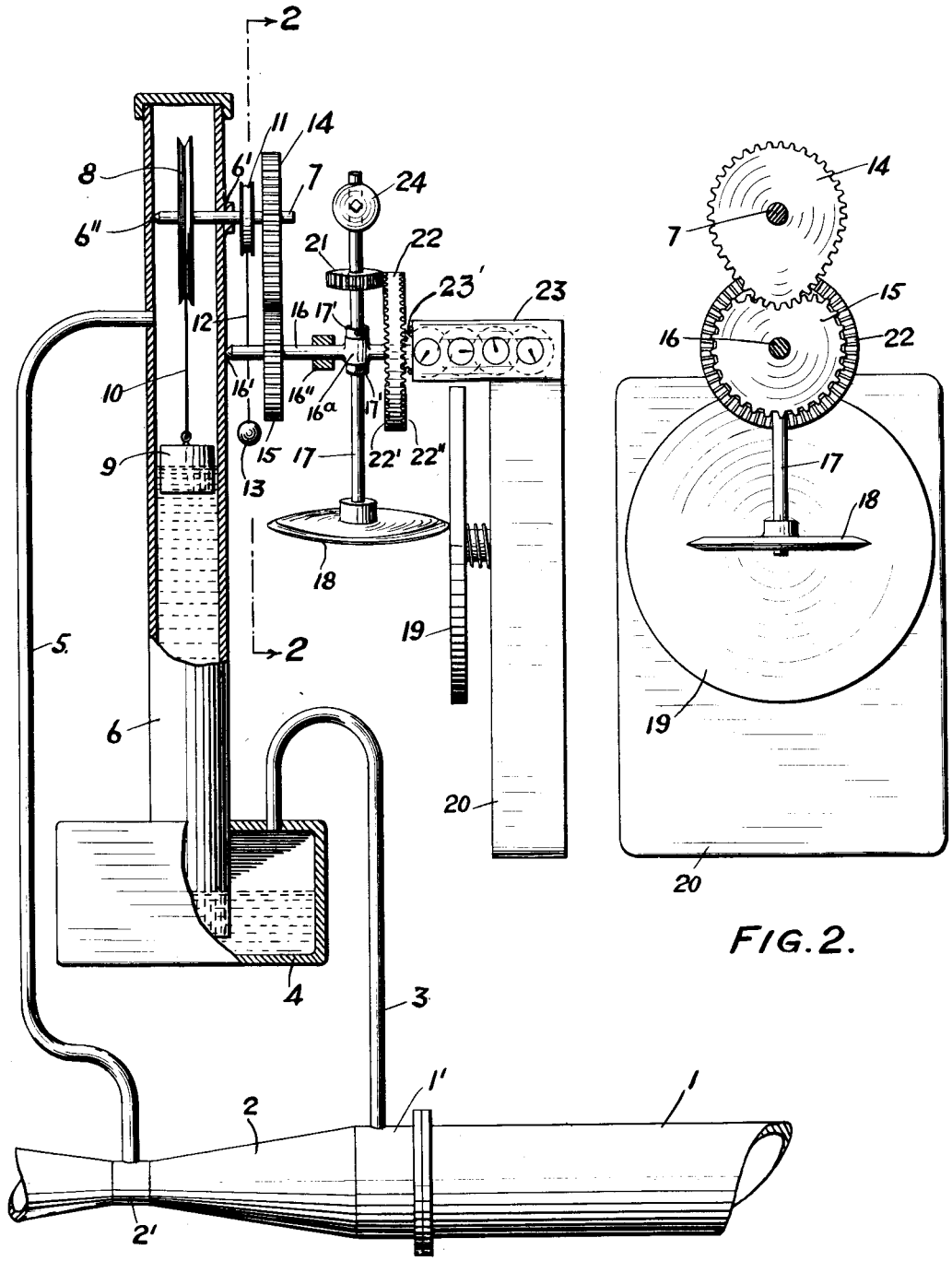

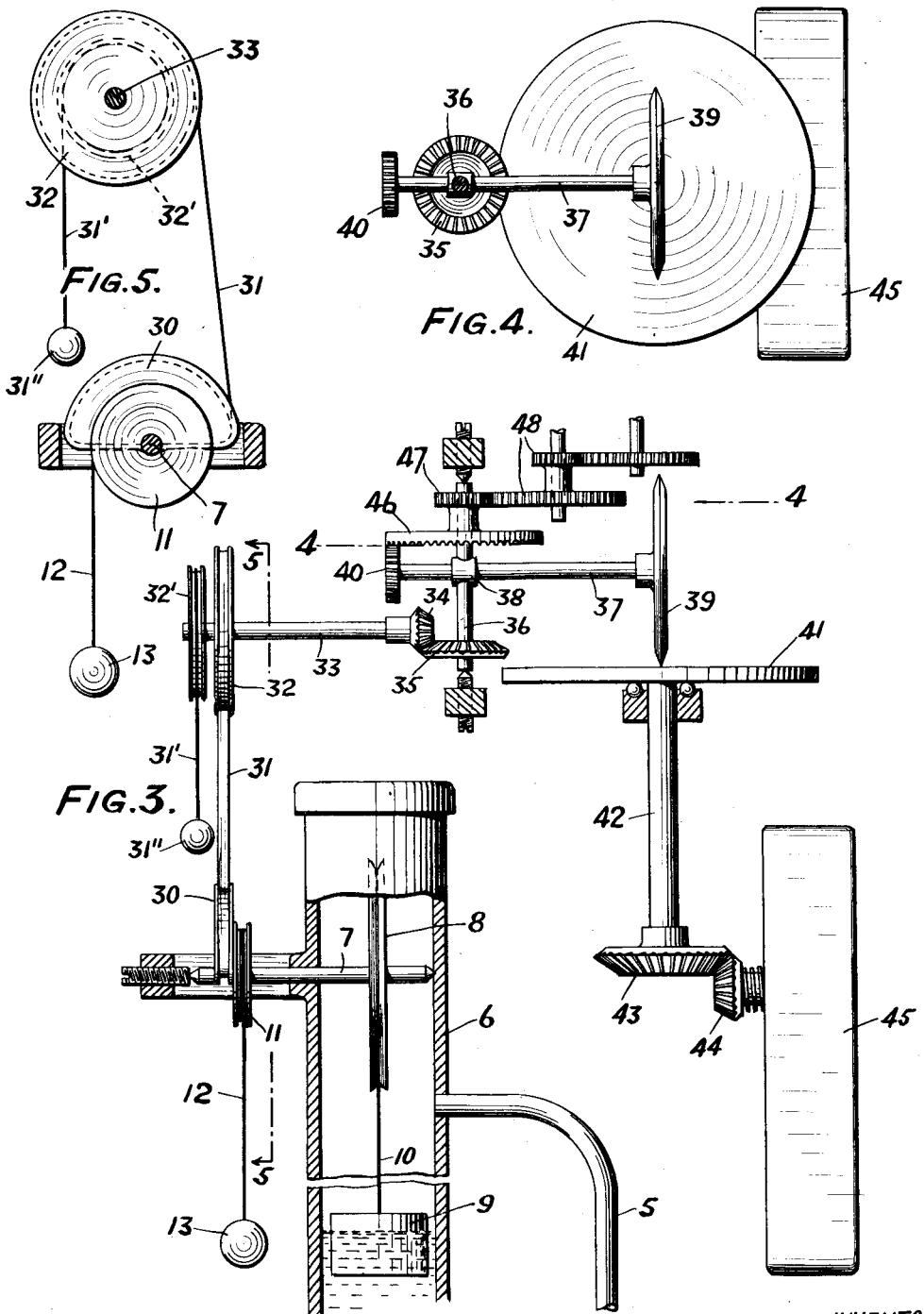

JOHN W. LEDOUX, OF SWARTHMORE, PENNSYLVANIA.

LIQUID-METER.

1,064,747.  Specification of Letters Patent.  Patented June 17, 1913.

Application filed December 9, 1909. Serial No. 532,181.

*To all whom it may concern:*

Be it known that I, JOHN W. LEDOUX, a citizen of the United States, residing at Swarthmore, in the county of Delaware and State of Pennsylvania, have invented certain Improvements in Liquid-Meters, of which the following is a specification.

My invention is a meter having improved means for integrating the flow of liquid.

The characteristic features of my improvements are disclosed in the following description and the accompanying drawings in illustration thereof.

In the drawings, Figure 1 is a sectional elevation of apparatus embodying my improvements; Fig. 2 is a sectional view taken on the line 2—2 of Fig. 1; Fig. 3 is a sectional elevation of a second form of apparatus embodying my improvements; Fig. 4 is a plan view taken on the line 4—4 of Fig. 3, and Fig. 5 is an elevational view taken on the line 5—5 of Fig. 3.

In the apparatus shown in Figs. 1 and 2, a conduit 1, provided with the Venturi section 2, has its normal section 1' connected by a tube 3 with the top of a closed mercury reservoir 4 and the throat 2' of its Venturi section connected by a tube 5 with the top of the stand pipe 6 which extends through the top of the reservoir to a point near its bottom, the top of the stand pipe being closed and its bottom being open. A shaft 7 is journaled in bearings 6' and 6'' of the stand pipe 6 and has a sheave 8 fixed thereon within the pipe. A float 9 is supported by mercury, in the pipe, and is connected by a cord 10 with the sheave 8. A sheave 11 is fixed on the shaft 7 and carries a cord 12 which supports a weight 13 for counterbalancing the float 9. A cam gear 14, having a curve which is a function of the rate of flow, is fixed to the shaft 7, exterior to the pipe, and meshes with a complementary cam gear 15 fixed on a revoluble shaft 16, the latter being supported in suitable bearings as 16' and 16''. A shaft 17 extends transversely to the shaft 16 and is journaled in the bearing 16ª thereof, the shaft 17 being held against longitudinal movement by the collars 17' thereon. A disk 18, having its periphery drawn to an edge, is fixed to the shaft 17 and bears upon the face of a disk 19 which is driven at a constant rate by a clock 20, the disk 18 being oscillated by the shaft 16 in an arc passing through the axis of the disk 19.

A gear 21, fixed on the shaft 17, meshes with the teeth 22' of a crown gear 22 revoluble on the shaft 16, and the teeth 22'' of the crown gear 22 mesh with the gear 23' of a register 23. The wheel 18 is balanced by the gear 21 and by a counterweight 24.

In the foregoing mechanism, when there is no flow in the conduit 1, equal pressures will be communicated through the conduits 3 and 5 to the respective pressure chambers 4 and 6, the mercury and float 9 will fall to their lowest level in the chamber 6, and the disk 18 will be held in contact with the center of the disk 19, by reason of the action of the float through the cord 10, sheave 8, shaft 7, cam gear 14, cam gear 15, shaft 16 and shaft 17. In this position of the disk 18, it is not revolved, hence the parts 17, 21 and 22 are not revolved and the register is inactive. As the flow increases from zero to the maximum, the mercury and the float 9 rise, according to the known law, in the chamber 6, and the movement is communicated, by the action of the weight 13, through the cord 12, sheave 11, shaft 7, cam gear 14, cam gear 15, shaft 16 and shaft 17 to the wheel 18, which is moved outwardly from the center toward the periphery of the disk 19. As the disk 18 moves from the center toward the periphery of the disk 19 revolving at a constant rate, the former is revolved at a rate increasing at a rate which is a known function of the rate of flow. As the revolution of the disk 18 is communicated through the shaft 17, gear 21, and gear 22 to the register 23, the latter will indicate the quantity of flow.

In the apparatus shown in Figs. 3, 4, and 5, as before, the shaft 7 has, within the chamber 6, its sheave 8 connected with the float 9 by the cord 10, and, without the chamber, its sheave 11 connected by the cord 12 with a counterweight 13. In this second embodiment of the invention, the shaft 7 has fixed thereto a cam sheave 30, whose curve is a function of the rate of flow, the cam's surface extending through the axis of the shaft. A strap or cord 31 is fixed to the cam and passes over the sheave 30 to a circular sheave 32 which is fixed on a movement of the part 31. A crown gear 34 the shaft 33 and has connected therewith a cord 31', which supports a counter-balance 31'' for revolving the shaft in the upward movement of the part 31. A crown gear 34 is fixed on the shaft 33 and meshes with a crown gear 35 fixed on the revoluble shaft 36. A shaft 37, extending transversely to the shaft 36 and journaled in the bearing 38 carried thereby, has fixed thereto the disk 39 and the gear 40. The disk 39 bears upon a disk 41, the former being oscillatable in an arc passing through the center of the latter by the oscillation of the shaft 36. The disk 41 is fixed on a revoluble shaft 42 which is revolved by a gear 43 fixed thereon and meshing with a gear 44 driven at a constant rate by a clock 45. The gear 40 meshes with a crown gear 46 which is revoluble on the shaft 36 and has fixed thereto a gear 47 for driving the register's gear train 48. In this second form of the apparatus, when the float 9 falls to its lowest position, the sheave 30 will stand with the flat portion of its cam surface upright, or substantially tangential to the sheave 32. As the float rises the cam is turned and moves the strap 31 and sheave 32, the position of the strap at any instant being a function of the rate of flow and the extent of movement being a function of the variation in the rate of flow. Consequently the movement communicated, through the shaft 33, gear 34, gear 35, shaft 36 and shaft 37, will move the disk 39 away from the center of the disk 41 a distance which is a function of the rate of flow. As the revolution of the disk 39, by reason of its contact with the constantly revolving disk 41, is a function of the flow, it will act through the shaft 37, gear 40, gear 46, gear 47 and gears 48 to cause the register to indicate the flow.

Having described my invention, I claim:

1. In a liquid meter, a revoluble cam, means comprising a fluid conduit having a contracted section whereby said cam is turned to a position which is a function of the flow of fluid in said conduit, said cam having a curvature which is a function of the rate of flow in said conduit, a device revoluble at a regular rate, revoluble and oscillatable means comprising a disk adapted to make contact with and be revolved by said device, and mechanism whereby said cam oscillates said last named means.

2. In a liquid meter, differential pressure mechanism comprising a fluid conduit, a revoluble cam having a curvature which is a function of the flow in said conduit, means whereby the position of said cam is determined by said differential pressure mechanism, a journaled shaft, means whereby said cam determines the position of said shaft, a second shaft, means whereby said second shaft is journaled in relation to and oscillated by said shaft first named, a disk carried by said second named shaft, and a constantly revolving device with which said disk makes contact.

3. In a liquid meter, a stand pipe, a journaled shaft extending into said pipe, a sheave fixed on said shaft in said pipe, a float in said pipe, means connecting said float and sheave, counter-balancing mechanism connected with said shaft, cam mechanism connected with and operated by said shaft, a second revoluble shaft, means whereby said second shaft is operated by said cam mechanism, a third revoluble shaft having a journaled connection with said second shaft, a gear loose on said second shaft, a gear fixed on said third shaft and engaging said gear first named, an indicating mechanism operated by said gear first named, and means for revolving said third shaft.

4. In a liquid meter, a chamber, a float in said chamber, a revoluble sheave, means connecting said float and sheave, a cam connected and revoluble with said sheave, a second sheave, means whereby said second sheave operates under control of said cam, gear mechanism revolved by said last named sheave, a disk moved in an orbit by said gear mechanism, means for revolving said disk on its axis, and indicating means operated by said disk.

In witness whereof I have hereunto set my name this 30th day of October, 1909, in the presence of the subscribing witnesses.

JOHN W. LEDOUX.

Witnesses:
ROBERT JAMES EARLAY,
C. N. BUTLER.